(12) United States Patent
Ishikawa et al.

(10) Patent No.: US 6,697,622 B1
(45) Date of Patent: Feb. 24, 2004

(54) CONTROL METHOD OF SEARCHING NEIGHBORING CELLS, MOBILE STATION, AND MOBILE COMMUNICATION SYSTEM

(75) Inventors: Yoshihiro Ishikawa, Kanagawa (JP); Seizo Onoe, Kanagawa (JP); Kazufumi Yunoki, Kanagawa (JP); Akihiro Higashi, Kanagawa (JP)

(73) Assignee: NIT DoCoMo, Inc., Tokyo (JP)

( * ) Notice: Subject to any disclaimer, the term of this patent is extended or adjusted under 35 U.S.C. 154(b) by 580 days.

(21) Appl. No.: 09/655,122

(22) Filed: Sep. 5, 2000

(30) Foreign Application Priority Data

Sep. 6, 1999 (JP) .......................................... 11-252294
Sep. 14, 1999 (JP) .......................................... 11-260409

(51) Int. Cl.[7] .............................................. H04Q 7/20
(52) U.S. Cl. ....................... 455/434; 455/574; 370/329; 370/335; 370/342; 375/137; 375/140; 375/145
(58) Field of Search ................................. 455/434, 574; 370/491, 329, 335, 342; 375/137, 140, 145

(56) References Cited

U.S. PATENT DOCUMENTS

| | | | |
|---|---|---|---|
| 5,574,996 A | | 11/1996 | Raith |
| 5,577,022 A | * | 11/1996 | Padovani et al. |
| 5,987,012 A | | 11/1999 | Bruckert et al. |
| 6,154,455 A | * | 11/2000 | Mekkoth et al. |
| 6,157,820 A | * | 12/2000 | Sourour et al. |
| 6,542,743 B1 | * | 4/2003 | Soliman |

FOREIGN PATENT DOCUMENTS

| | | | |
|---|---|---|---|
| DE | 197 54 204 | 6/1998 | |
| EP | 0852430 A2 | 7/1998 | ............ H04B/7/707 |
| EP | 0892503 A2 | 1/1999 | ............ H04B/1/707 |
| GB | 2 320 654 | 6/1998 | |
| GB | 2 320 655 | 6/1998 | |
| GB | 2 317 077 | 11/1998 | |
| JP | WP97/33400 | 9/1997 | |
| JP | 10191428 | 7/1998 | |

OTHER PUBLICATIONS

Higuchi, et al., "Fast Cell Search Algorithm In Inter–Cell Asynchronous DS–CDMA Mobile Radio," IEICE Trans. Commun., vol. E81–B, No. 7, Jul. 1998.

"Japan's Revised Proposal For Candidate Radio Transmission Technology On IMT–2000: W–CDMA, (W–CDMA Revised Proposal Version 1.1)," Sep. 1998, ARIB IMT Study Committee.

(List continued on next page.)

*Primary Examiner*—Nguyen T. Vo
*Assistant Examiner*—Huy D Nguyen
(74) *Attorney, Agent, or Firm*—Workman Nydegger

(57) ABSTRACT

A control method of searching for a neighboring cell of a mobile station communicating with a base station is provided in a direct sequence CDMA mobile communication system which transmits information by carrying out double modulation using a first spreading code group and a second spreading code. The first spreading code group includes spreading codes that have a same repetition period as an information symbol period and are used in common by the base stations, and the second spreading code has a repetition period longer than the information symbol period. The base stations are assigned different second spreading codes. The control method stores at least one second spreading code and its phase into a first table, which second spreading code corresponds to a perch channel whose second spreading code and phase are known; stores a second spreading code used by a neighboring base station into a second table; searches for a perch channel whose second spreading code and phase are unknown; and searches for a perch channel whose second spreading code and phase are known. The neighboring cell search method can save the power consumption and time required for the mobile station to carry out the cell search with preventing an increase in the total cost of the system.

13 Claims, 15 Drawing Sheets

OTHER PUBLICATIONS

Yunoki, et al., Cell Search Strategy on W–CDMA Mobile Station, IEICE General Conference, B–5–186 of the 1999 General Meeting [partial translation].

Higuchi, et al., "Experiments on fast cell search algorithm for intercell asynchronous W–CDMA mobile radio," Electronics Letters, 24$^{th}$ Jun. 1999, vol. 35, No. 13.

3G TS 25.211 V3.3.0 (2000–06), Technical Specification, Valbonne, France.

Higuchi, et al., "Fast Cell Search Algorithm using Long Code Masking in DS–CDMA Asynchronous Cellular System," IEICE, 1997 [partial translation].

* cited by examiner

CONTROL METHOD OF SEARCHING NEIGHBORING CELLS, MOBILE STATION, AND MOBILE COMMUNICATION SYSTEM

This application is based on Japanese Patent Application Nos. 11-252294 (1999) filed Sep. 6, 1999 and 11-260409 filed Sep. 14, 1999, the contents of which are incorporated hereinto by reference.

BACKGROUND OF THE INVENTION

1. Field of the Invention

The present invention relates to a mobile communication system for carrying out multiple access using spread spectra, and particularly to a neighboring cell search method applied to handover control during communication or to zone re-selection control during the idle mode in the system and a mobile station constituting the system.

2. Description of the Related Art

A mobile communication system like a widespread mobile phone system offers its services by dividing the entire service area into rather small radio zones called cells. As shown in FIG. 1, such a system comprises a plurality of base stations 111 for covering divided radio zones (cells), and mobile stations 112 for communicating with the base station by estabishing radio channels. Direct Sequence CDMA (DS-CDMA) is a scheme for a plurality of users to carry out communications using the same radio frequency band by transmitting information through second modulation that spreads a conventional information data modulation signal with a high rate spreading code. The radio signal of each user is identified by a spreading code assigned to the user.

In the mobile communication system, the spreading code used for the spreading usually consists of a combination of two types of spreading codes: a "first spreading code group" with the same period as an information symbol period and commonly assigned to all the base stations; and a "second spreading code" with a considerably longer period than the information symbol period and uniquely assigned to each of the base stations.

FIG. 2 is a schematic diagram illustrating a method of using the spreading codes in the mobile communication system to which the present invention is applied. In FIG. 2, the upper layer represents a scrambling code layer 202 with a long period uniquely assigned to individual base stations, and the lower layer represents a channelization code layer 204 with a short period commonly assigned to all the base stations. The signals transmitted from the base stations are identified using long period scrambling codes uniquely assigned to the individual base stations. A plurality of codes are defined as the scrambling codes for the entire system, and system designers select the codes to be assigned to the base stations among them.

For the mobile stations to demodulate information transmitted from the base stations, they must receive the information in synchronization with the timing of the spreading code repeated periodically at the transmitting side. In particular, as for the scrambling codes, detection of the timing requires a long time because of the long period. Accordingly, it is important for the mobile station to detect the repetition timing of the scrambling codes to demodulate perch channels of the base stations. In the present specification, the repetition timing of the scrambling codes is referred to as "phase". It is not necessary to detect the absolute phase in practice, but to find the relative difference in the timing between the scrambling codes of the base stations, that is, the phase difference. Thus, the term "phase" refers to the relative phase between the scrambling codes in the present specification.

FIG. 3 is a schematic diagram illustrating timing relationships between the scrambling codes associated with signals sent from the base stations to a mobile station.

FIG. 3 illustrates a case of an inter-cell asynchronous mobile communication system, in which synchronization between the base stations are not necessarily required, and the timing of the scrambling codes received by the mobile station differs for each base station. On the contrary, in an inter-cell synchronous system establishing synchronization between the base stations, the timing of the scrambling codes is exactly adjusted to the timing assigned in advance to the base stations. Accordingly, the relative timing of the scrambling codes between the base stations is fixed and unchangeable. Comparing the inter-cell asynchronous system with the inter-cell synchronous system, the former has an advantage over the latter that it does not require any timing source such as the GPS (Global Positioning System) which is necessary for the synchronous system, and hence is more flexible in extending the system or the like.

The radio signal transmitted from a base station at certain transmission power travels through space with a certain attenuation, and arrives at a receiving site. Since the attenuation the radio signal undergoes increases with the distance from the transmitting site to the receiving site, it is common that a perch channel transmitted from a distant base station is received at a lower received level, and a perch channel transmitted from a near base station is received at a higher received level. In practice, however, the propagation loss is not determined only by the distant, but varies because of such conditions as the geography and buildings. As a result, the received power of the perch channels from the base stations fluctuate sharply with the move of the mobile station. In the condition in which the received levels of the perch channels from the base stations fluctuate sharply, perch channels received above a certain required received level alter incessantly. This is because the received level of the current perch drops suddenly, or the received level of a perch unreceivable increases abruptly above the receivable level. Thus, to receive the signals from the base stations with better quality, it is important for the mobile station to continuously monitor the perches from the base stations, and to select the best base station.

In the asynchronous mobile communication system, a mobile station must search for a perch quickly whose spreading code and phase are unknown. As a method of searching for a phase, there is one called "3-step cell search" disclosed in a document by K. Higuchi, M. Sawahashi go, and F. Adachi, "Fast Cell Search Algorithm In Inter-Cell Asynchronous DS-CDMA Mobile Radio", IEICE Trans. Commun., Vol. E81-B, No.7, July 1998. The method provides a "masked symbol" to part of the perch channel which undergoes double spreading by a channelization code and a scrambling code. Here, the "masked symbol" is spread only by the channelization code without using the scrambling code.

FIG. 4 is a schematic diagram illustrating a structure of a perch channel.

First, the mobile station despreads the received signal using a channelization code 404 commonly used by all the base stations. This enables the mobile station to detect a peak at the timing of a masked symbol 408 of the received signal independently of the types of the scrambling codes (first step).

Subsequently, in response to the timing extracted at the first step, the mobile station detects a scrambling code group code 406 superimposed at the same position as the masked symbol 408, and identifies the group to which the scrambling code belongs which is used by the base station in connection with the reception (second step).

Finally, using the scrambling codes belonging to the group determined at the second step, the mobile station identifies the scrambling code 402 used by the base station (third step).

In the system to which this method is applied, a lot of scrambling codes are divided into groups in advance. In contrast, in the inter-cell synchronous system, since the phase differences of the scrambling codes between the base stations are known in advance, and hence the searching timing can be limited to a fixed timing width (search window), the power consumption or time taken for the cell search can be saved.

The conventional search method in the inter-cell asynchronous system, however, requires more power consumption and time for the cell search than the inter-cell synchronous system, presenting a problem of exhausting the battery power of the mobile terminal quickly. On the other hand, employing the inter-cell synchronous system to simplify the cell search of the mobile station presets problems of hindering making full use of the above mentioned advantages of the inter-cell asynchronous system, and of increasing the cost of the total system.

As described above, the mobile communication system such as a currently wide spread mobile phone system comprises the plurality of base stations 111 for covering divided radio zones, and the mobile stations 112 for communicating with the base stations by establishing radio channels as shown in FIG. 1.

The radio signal transmitted from a base station at certain transmission power travels through space with a certain attenuation, and arrives at a receiving site. Since the attenuation the radio signal undergoes increases with the distance from the transmitting site to the receiving site, a perch channel transmitted from a distant base station is usually received at a lower received level, and a perch channel transmitted from a near base station at a higher received level. In practice, however, the propagation loss is not determined only by the distant, but varies because of such conditions as the geography and buildings. As a result, the received power of the perch channels from the base stations fluctuates sharply with the move of the mobile station. Thus, to receive the signals from the base stations at better quality, it is important for the mobile station to continuously monitor the perch channels from the base stations, and to select the best base station. To select the best base station, the mobile station must continuously confirm the propagation condition of a captured perch channel, or search for uncaptured new perch. Such confirmation of the propagation state of the captured perch channel and the search for the uncaptured new perch channel are generically called "quality measurement of the perch channel" in the present specification.

On the other hand, a technique called intermittent reception is applied to the mobile station to prolong the life of the battery by reducing the power consumption. Although the mobile station in an idle mode must continuously monitor the paging, the intermittent reception halts the receiver as much as possible when unnecessary to receive, thereby saving the power consumption.

FIG. 5 is a schematic diagram illustrating a structure of a paging channel defined by ARIB IMT-2000 Study Committee, "Japan's Revised Proposal for Candidate Radio Transmission Technology on IMT-2000: W-CDMA Revised Proposal Version 1.1" (September, 1998, ARIB). According to this paper, to increase the effect of the intermittent reception, the paging channel is structured such that multiple mobile stations are divided into a plurality of groups, and paging signals for respective groups are mapped onto a single physical channel. FIG. 5 illustrates a paging signal assigned to one of the groups. In FIG. 5, reference symbols PIs each designate a very short signal informing whether paging is present or not. Reference symbols MUIs each designate a portion including paging information (ID number of mobile station). In FIG. 5, such a configuration is assumed in which the PIs are transmitted twice (PI1 and PI2) to improve the receiving accuracy of the PI, and four pieces of paging information (MUI1–MUI4) can be transmitted for four mobile stations per group. In other words, the paging signal consists of two PIs and four MUIs, and receiving time period per paging signal is about 15 milliseconds. The paging channel consists of multiplexed paging signals with the same structure, the number of which equals the number of the groups. FIG. 5 illustrates that the mobile station receives the paging signal of its own group at every 720 millisecond interval.

The mobile station receives the PI portion, first, and then the MUI portion only when a decision is made that the paging is present as a result of receiving the PI portion. This offers two advantages: First, it is enough for the mobile station to receive only the paging of its own group; and second, to receive only the PI portion when there is not paging information. This in turn can limit the actually required receiving time rate to a small value, making it possible to reduce the power consumption to a very small amount.

FIG. 5 illustrates the paging information which is already transmitted from the base station and selected through the decision by the mobile station. In an actual situation, however, the mobile station must search for the perch channels of the neighboring base stations as it moves. Since the mobile station must receive a lot of receivable perch channels to search for the neighboring base stations, it is important to minimize the frequency of the search operation to increase the effect of the intermittent reception.

Thus, to select the best base station with the movement of the mobile station, there is a trade off between the continuous monitoring of the perch channels of the neighboring base stations by searching and receiving them, and the reduction in the operation time rate of the receiver to prolong the battery of the mobile station as long as possible. On the one hand, the reduction in the operation time rate of the receiver will results in a decrease in the selection accuracy of the base station, bringing about undesirable results such as degradation in the service quality. On the other hand, an increase in the operation time rate of the receiver to improve the selection accuracy of the base station will consume the battery of the mobile station quickly, presenting a problem of markedly impairing the usefulness of the mobile station. In the conventional cell search control method, however, the quality measurement of the perch channel is implemented periodically as described in the following paper with considering the trade off between the selection accuracy of the base station and the service quality: K. Yunoki, A. Higashi and N. Tsutsumi, "Cell Search Strategy on W-CDMA Mobile Station", B-5-186 of the 1999 IEICE General Conference. Specifically, since the quality measurement of the perch channel is carried out independently of the reception of the paging signal, the mobile station must operate its receiver at both timings of quality measurement of the perch channel and the reception of the paging signal, which presents a problem of increasing the consumption of the battery, one of the essential resources of the mobile station.

SUMMARY OF THE INVENTION

It is therefore an object of the present invention to provide a control method of searching for a neighboring cell, and a mobile station in an inter-cell asynchronous system with taking full advantage of the system, and saving the power consumption and time required for the cell search by the mobile station without increasing the total cost of the system.

Another object of the present invention is to save the power consumption with maintaining the accuracy of selecting the best base station in the mobile communication system that comprises a plurality of base stations and mobile stations communicating with the base stations by means of the code division multiple access. This is implemented by the mobile station by receiving perch channels transmitted from the base stations, by deciding the base station the mobile station should wait for or communicate with, and by monitoring the paging signal to the mobile station itself by the intermittent reception in the idle mode.

In the first aspect of the present invention, there is provided a control method of searching for a neighboring cell of a mobile station communicating with base stations in a direct sequence CDMA mobile communication system which transmits information by carrying out double modulation using a first spreading code group and one of second spreading codes, the first spreading code group including spreading codes that have a same repetition period as an information symbol period and are used in common by the base stations, the second spreading codes having a repetition period longer than the information symbol period, and being different for each of the base stations, the control method of searching for a neighboring cell comprising:

a step of storing into a first table the second spreading code and its phase of at least one perch channel, which second spreading code and phase are known;

a step of storing a second spreading code used by a neighboring base station into a second table;

a first search step of searching for a perch channel whose second spreading code and phase are unknown; and a second search step of searching for a perch channel whose second spreading code and phase are known, wherein the control method of searching for a neighboring cell carries out the first search step and the second search step using the first table and the second table.

Here, the control method of searching for a neighboring cell may further comprise the step of transferring, when capturing a perch channel in the first search step of searching for a perch channel whose second spreading code and phase are unknown, the second spreading code corresponding to the perch channel from the second table to the first table.

The control method of searching for a neighboring cell may further comprise the steps of:

carrying out the second search step using the first table;

carrying out the first search step using the second table; and detecting a new perch channel by comparing a search result at the second search step with a search result at the first search step.

The first search step may comprise:

a step of detecting a peak of a received signal at a timing of a masked symbol of the received signal by despreading the received signal using the first spreading code group;

a step of identifying a group to which the second spreading code belongs; and a step of identifying the second spreading code. The control method of searching for a neighboring cell may comprise the steps of:

carrying out the second search step using the first table;

carrying out a third search step using the second table, the third search step consisting of part of sub-steps constituting the first search step;

deciding detection of a new perch channel by comparing a search result of the second search step with a search result of the third search step; and carrying out a fourth search step in response to a decision result, the fourth search step consisting of sub-steps of the first search step, which are not carried out in the third search step.

The direct sequence CDMA mobile communication system may spread information into a signal with a bandwidth broader than a frequency bandwidth of the information using a spreading code sequence with a rate higher than an information transmission rate.

In the second aspect of the present invention, there is provided a mobile station communicating with base stations in a direct sequence CDMA mobile communication system which transmits information by carrying out double modulation using a first spreading code group and one of second spreading codes, the first spreading code group including spreading codes that have a same repetition period as an information symbol period and are used in common by the base stations, the second spreading codes having a repetition period longer than the information symbol period, and being different for each of the base stations, the mobile station comprising:

a first table for storing the second spreading code and its phase of at least one perch channel, which second spreading code and phase are known;

a second table for storing a second spreading code used by a neighboring base station;

first search means for searching for a perch channel whose second spreading code and phase are unknown; and a second search means for searching for a perch channel whose second spreading code and phase are known, wherein the first search means and the second search means carry out their search using the first table and the second table.

Here, the mobile station may further comprise means for transferring, when the first search means captures a perch channel whose second spreading code and phase are unknown as a result of the search, the second spreading code corresponding to the perch channel from the second table to the first table.

The second search means may carry out its search using the first table;

the first search means may carry out its search using the second table, and the mobile station may further comprise: means for making decision of detecting a new perch channel by comparing a search result by the second search means with a search result by the first search means.

The first search means may comprise:
   means for detecting a peak of a received signal at a timing of a masked symbol of the received signal by despreading the received signal using the first spreading code group;
   means for identifying a group to which the second spreading code belongs; and
   means for identifying the second spreading code.

The second search means may carry out its search using the first table, and the mobile station may further comprise:
   third search means for carrying out its search using the second table, the third search means consisting of part of the first search means;
   means for deciding detection of a new perch channel by comparing a search result of the second search means with a search result of the third search means; and
   fourth search means for carrying out its search in response to a decision result, the fourth search means consisting of a remaining part of the first search means.

The direct sequence CDMA mobile communication system may spread information into a signal with a bandwidth broader than a frequency bandwidth of the information using a spreading code sequence with a rate higher than an information transmission rate.

A direct sequence CDMA mobile communication system may comprise the mobile station.

According to the configuration, the power and time required for the cell search can be reduced because the first table, which is prepared for storing captured perch channels, that is, perch channels whose second spreading code and phase are acquired by the mobile station, enables the mobile station to carry out the search for the perch channel only in a predetermined time range (search window) with regard to the phase of the perch channel.

The mobile station usually receives from its visiting base station, information on the scrambling codes used by the neighboring base stations, and carries out the cell search in accordance with the information. The present invention is configured such that it transfers the captured perch channels from the second table to the table of already captured perches. This makes it possible to further narrow down candidates in searching for the perch with the unknown phase, thereby simplifying the search for the perch not only with the known phase but also with the unknown phase.

Moreover, according to one aspect of the present invention, it applies the second search process to the first table; applies to the second table a third search process consisting of steps up to a midpoint of the steps of the first search process; makes a decision of the new perch channel by comparing the search result of the second search process with that of the third search process; and obtains the difference between the first search process and the third search process on the basis of the decision result. This enables the mobile station to make full use of the second spreading code and phase of each captured perch channel, and hence to make a decision as to whether a new perch channel other than the captured perch channel appears or not by carrying out the search of the perch channels with the known phases up to the intermediate step 1 or 2, without carrying out the entire three steps of the 3-step cell search, thereby simplifying the 3-step cell search which is not always essential.

In the third aspect of the present invention, there is provided a cell search control method in a CDMA mobile communication system including a mobile station which decides a base station the mobile station waits for or communicates with by receiving a perch channel transmitted from the base station, and which monitors a paging signal to the mobile station by means of intermittent reception in the idle mode, the cell search control method comprising the step of:
   carrying out, in the mobile station, measurement of receiving quality of the perch channel in synchronization with timing of receiving the paging signal sent to the mobile station.

Here, the measurement of the receiving quality of the perch channel may be carried out in the mobile station when a time period counted from a latest measurement of the receiving quality of the perch channel exceeds a predetermined value.

In the fourth aspect of the present invention, there is provided a CDMA mobile communication system including a mobile station communicating with a plurality of base stations,
   each of the base stations comprising:
      perch channel transmitting means for transmitting a perch channel to the mobile station; and
      paging signal transmitting means for transmitting a paging signal to the mobile station, and
   the mobile station comprising:
      base station decision means for deciding a base station the mobile station waits for or communicates with through the perch channel by receiving the perch channel transmitted by the perch channel transmitting means;
      paging signal reception decision means for deciding in an idle mode as to whether the paging signal transmitted to the mobile station by the paging signal transmitting means is received or not by intermittent reception; and
      receiving quality measurement means for measuring the receiving quality of the perch channel, wherein
         the receiving quality measurement means carries out the measurement of the receiving quality of the perch channel in synchronization with timing of receiving the paging signal when the paging signal reception decision means decides that the paging signal is received.

Here, the mobile station may further comprise counting means for counting a time period from a latest measurement of the receiving quality of the perch channel, and the receiving quality measurement means may carry out the measurement of the receiving quality of the perch channel when the time period counted by the counting means exceeds a predetermined value.

In the fifth aspect of the present invention, there is provided a mobile station in a CDMA mobile communication system communicating with a plurality of base stations, the mobile station comprising:
   base station decision means for deciding a base station the mobile station waits for or communicates with through a perch channel by receiving the perch channel transmitted from the base station;
   paging signal reception decision means for deciding in an idle mode as to whether the paging signal transmitted to the mobile station from the base station is received or not by intermittent reception; and
   receiving quality measurement means for measuring the receiving quality of the perch channel, wherein
      the receiving quality measurement means carries out the measurement of the receiving quality of the perch channel in synchronization with timing of receiving the paging signal when the paging signal reception decision means decides that the paging signal is received.

Here, the mobile station may further comprise counting means for counting a time period from a latest measurement of the receiving quality of the perch channel, and the receiving quality measurement means may carry out the measurement of the receiving quality of the perch channel when the time period counted by the counting means exceeds a predetermined value.

Thus, in the mobile communication system utilizing the code division multiple access, the base stations employ the same radio frequency. Accordingly, the perch channels and paging channels of the base stations are all transmitted on the same radio frequency, and are identified by the spreading codes. This makes it possible to use the radio stage, which receives the radio frequency and extracts the spread modulation signal, in common to receive the perch channels and paging channels, thereby reducing the uptime of the radio stage by matching the timing of receiving these channels.

As described above, because the base stations employ the same radio frequency, user radio waves of voices or data are also transferred at the same frequency. This can bring about the degradation in the receiving quality of the perch channel or paging channel because the user radio waves become interference in receiving the perch channel or paging channel.

Furthermore, in the time periods of much interference because of a great number of such user radio waves, the number of paging signals transmitted from the base stations over the paging channels are also increased. In contrast, in time periods suffering only small interference from the user radio waves, the number of paging signals transmitted from the base stations over the paging channels is also reduced. Thus, the receiving quality of the perch channels or paging channels depends on the transmission frequency of the paging signals in such a manner that it is improved with a decrease in the number of the paging signals, and impaired with an increase in the number thereof. This teaches that to maintain the selection accuracy of the base station at a high level when the receiving quality of the perch channel is low, it is necessary to increase the frequency of measuring the receiving quality of the perch channel, thereby increasing the quality measurement frequency.

According to one aspect of the present invention, it is configured such that it carries out the quality measurement of the perch channel in synchronization with the received timing of the paging signal. This will automatically increase the measurement frequency of the receiving quality of the perch channel in the case where the receiving quality is low, thereby improving the selection accuracy of the base station, but decrease the measurement frequency in the case where the receiving quality of the perch channel is high, thereby saving the power consumption. In addition, the present invention is configured such that it counts the elapsed time from the latest measuring of the receiving quality of the perch channel, and carries out the measurement of the receiving quality of the perch channel when the elapsed time exceeds a predetermined value. This makes it possible to carry out the measurement of the receiving quality of the perch channel at a minimum frequency even when the paging signals are very few such as in midnight.

The above and other objects, effects, features, and advantages of the present invention will become more apparent from the following description of embodiments thereof taken in conjunction with the accompanying drawings.

DETAILED DESCRIPTION OF THE PREFERRED EMBODIMENTS

The invention will now be described with reference to the accompanying drawings.

EMBODIMENT 1

Figure 6:
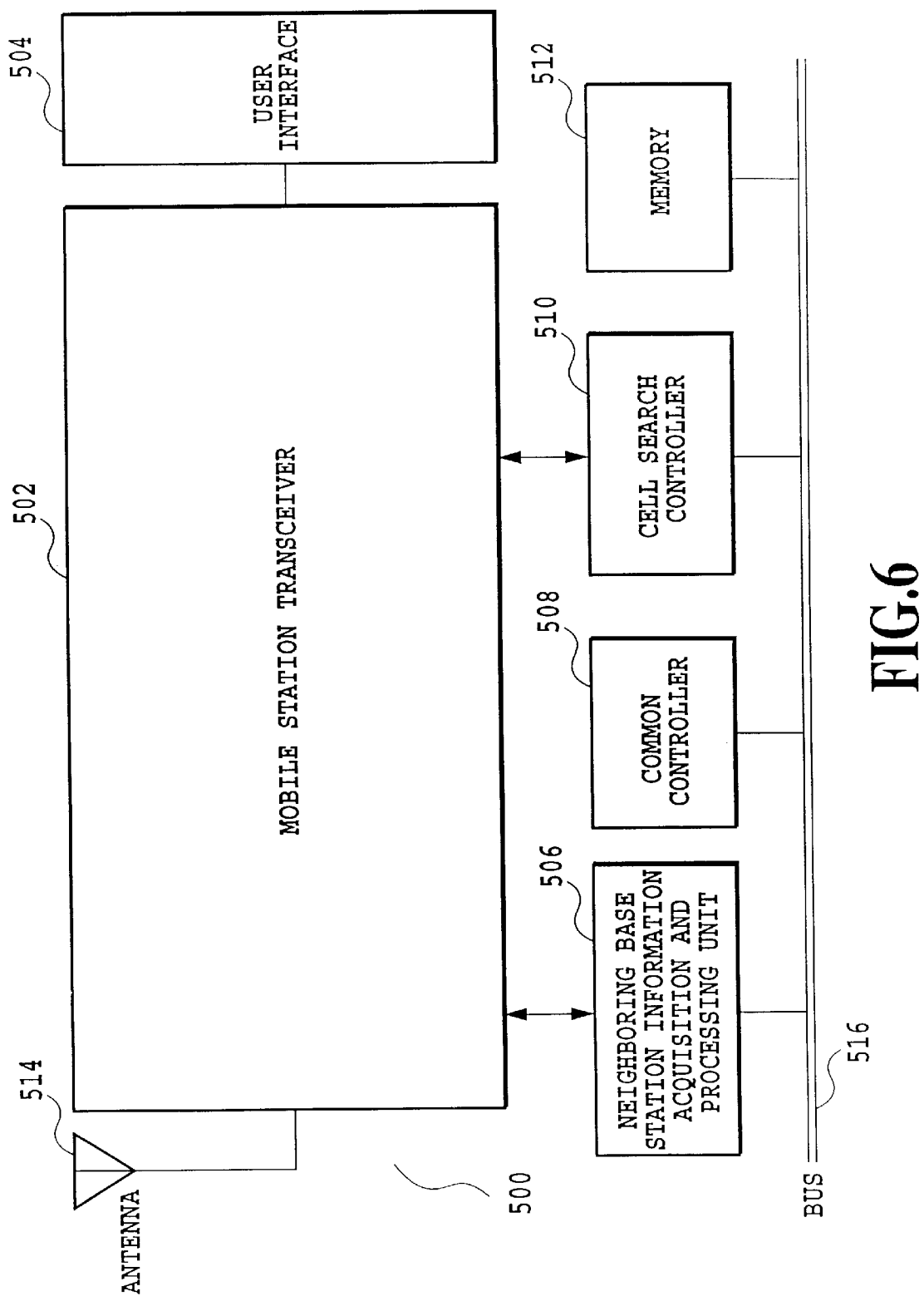
FIG. 6 is a block diagram showing a configuration of a mobile station to which the present invention is applied.

FIG. 6 is a block diagram showing a configuration of a mobile station to which the present invention is applied.

A mobile station 500 comprises a mobile station transceiver 502, a user interface 504, a neighboring base station information acquisition and processing unit 506, a common controller 508, a cell search controller 510, a memory 512, an antenna 514 and a bus 516. In the mobile station as shown in FIG. 6, only portions associated with the present invention are illustrated.

The mobile station transceiver 502 demodulates user information and control signals transmitted from the base stations after their radio frequency modulation, and transmitting user signals and control signals after their coding and modulation. The mobile station transceiver 502 is connected to the antenna 514 and user interface 504.

The common controller 508 carries out the overall control of the mobile station.

The cell search controller 510 controls the cell search operation with regulating the timing in accordance with neighboring base station information, and stores search results into the memory 512.

The neighboring base station information acquisition and processing unit 506 receives and processes scrambling code information about the neighboring base stations sent from the visiting base station, and stores it into the memory 512.

The bus 516 interconnects the common controller 508, cell search controller 510, neighboring base station information acquisition and processing unit 506 and memory 512.

Figure 7:
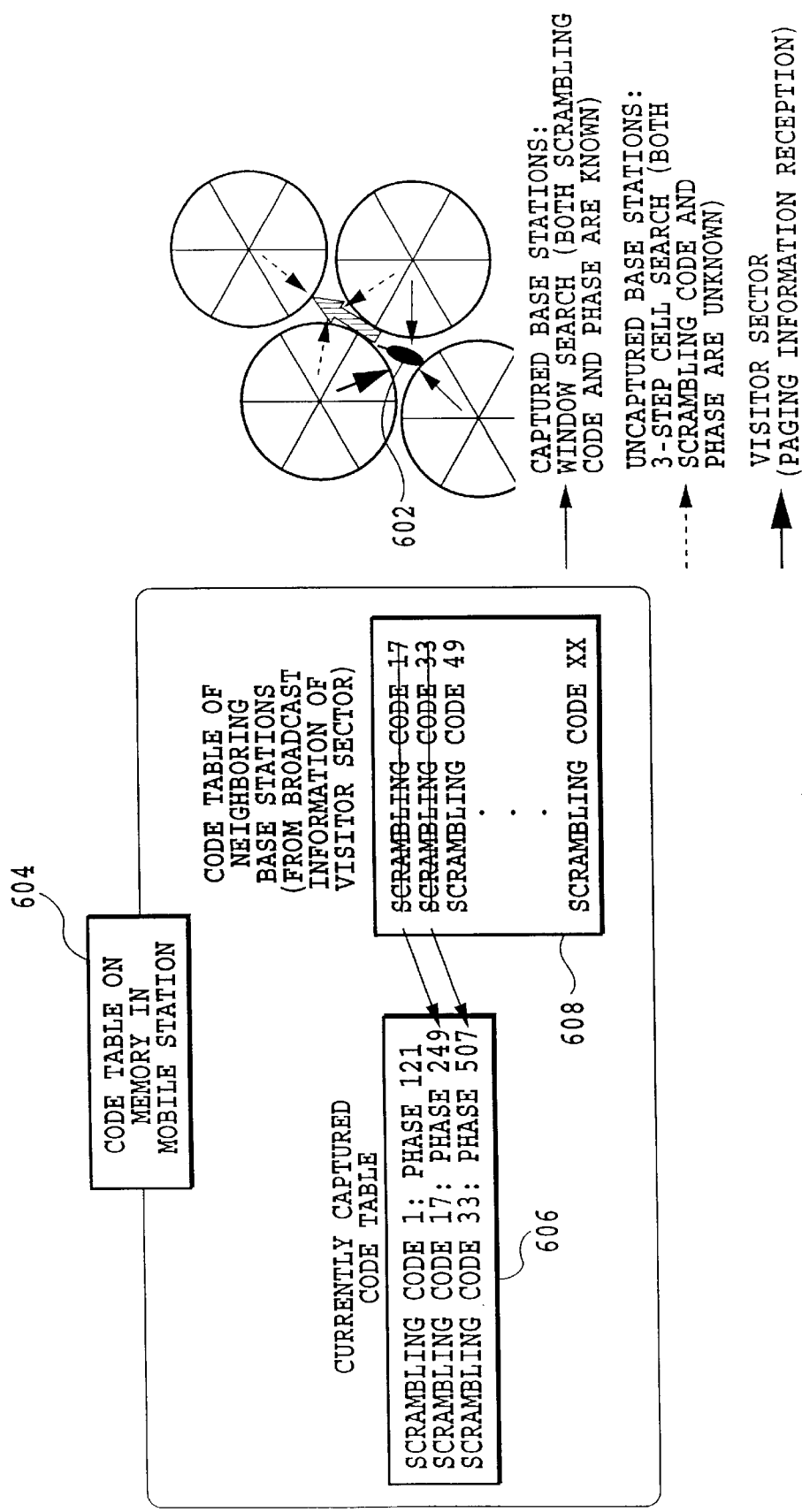
FIG. 7 is a schematic diagram illustrating an operation in accordance with the present invention.
Figure 10:
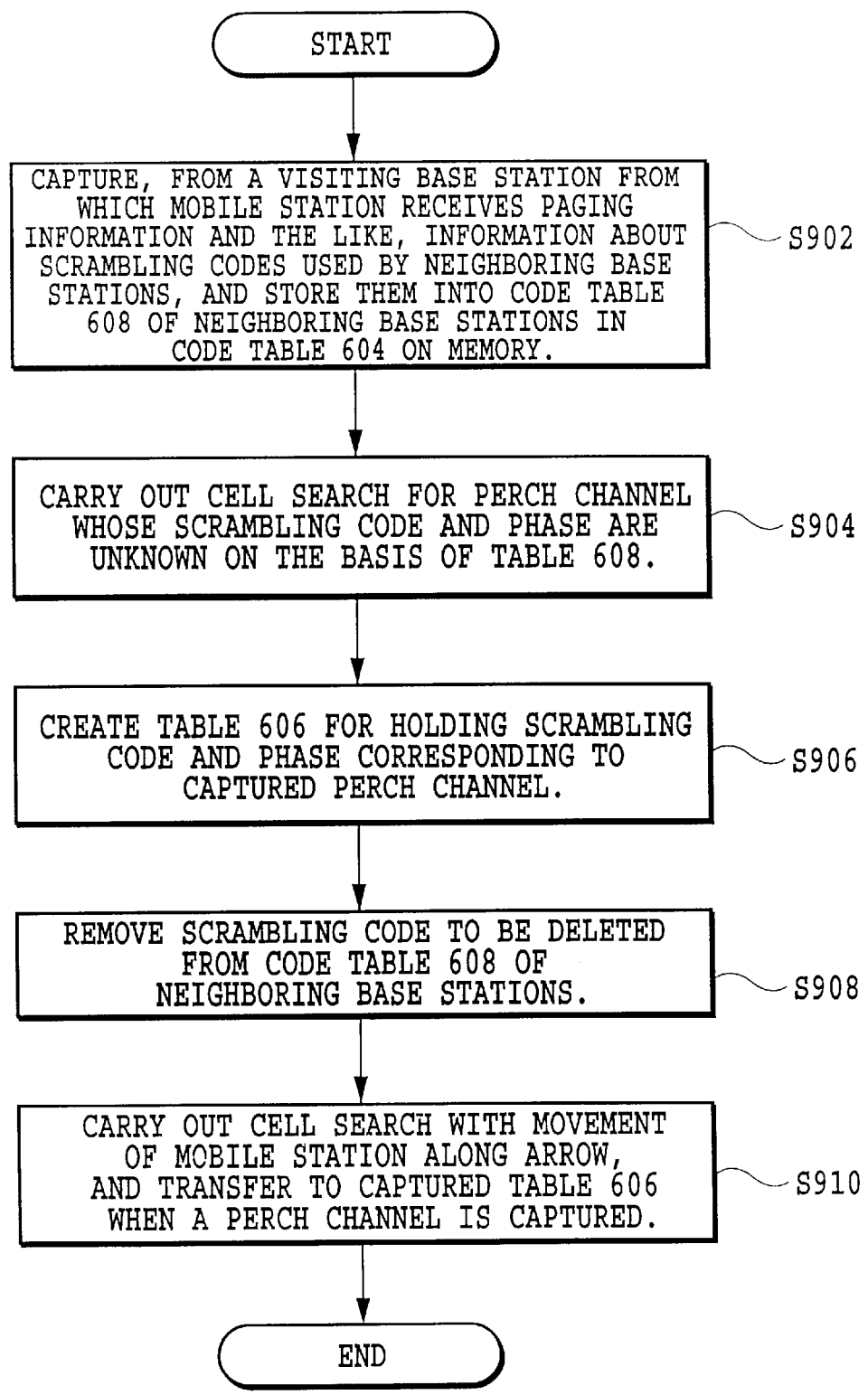
FIG. 10 is a flowchart illustrating an operation of the mobile station 602 in FIG. 7.

FIG. 7 is a schematic diagram illustrating an operation of the present invention. The operation of the mobile station 602 in FIG. 7 will now be described with reference to the flowchart of FIG. 10.

As illustrated in the right-hand side of FIG. 7, the mobile station 602 captures information about scrambling codes used by its neighboring base stations from the visiting base station, from which the mobile station receives the paging information, and stores the information into a code table 608 of the neighboring base stations in a code table 604 on the memory as illustrated in the left-hand side of FIG. 7 (step S902).

Using the table 608, the mobile station 602 carries out the cell search for perch channels with unknown scrambling codes and phases (step S904), creates a table 606 for holding the scrambling codes and phases of the captured perch channels (thin solid-line arrows on the right-hand side of FIG. 7) (step S906); and eliminates the scrambling codes from the code table 608 of the neighboring base stations (step S908).

As for the perch channels which cannot be captured until then (broken line arrows on the right-hand side of FIG. 7), both their scrambling codes and phases are unknown. As described above, the phases correspond to the phase differences between the scrambling codes. In FIG. 7, numerical examples are illustrated of the phase differences between the scrambling codes with regard to the timing the mobile station has as a reference, which numerical examples are represented in terms of chips (one chip corresponds to one bit of a spreading code consisting of a bit stream of "0" and "1").

Moving along the arrow, the mobile station carries out the cell search, and when it can capture a cell, it transfers it to the captured table 606 (step S910).

Figure 8:
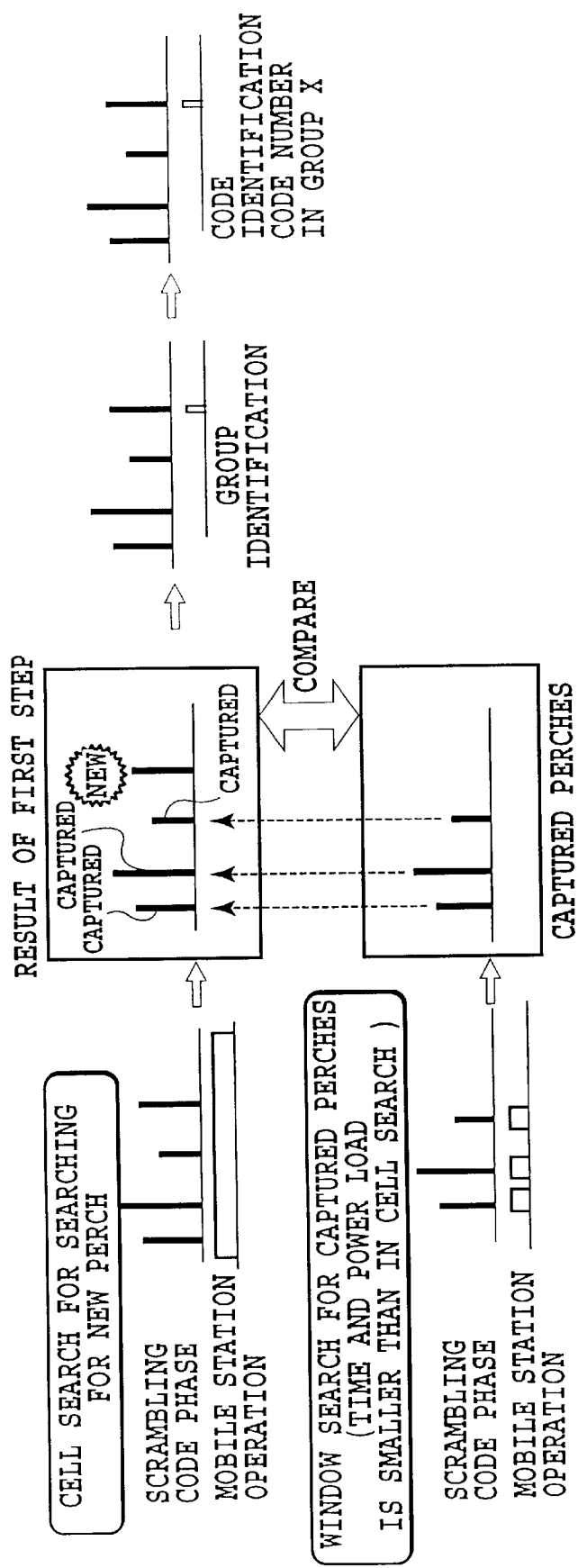
FIG. 8 is a schematic diagram illustrating an operational of deciding a new perch.
Figure 11:
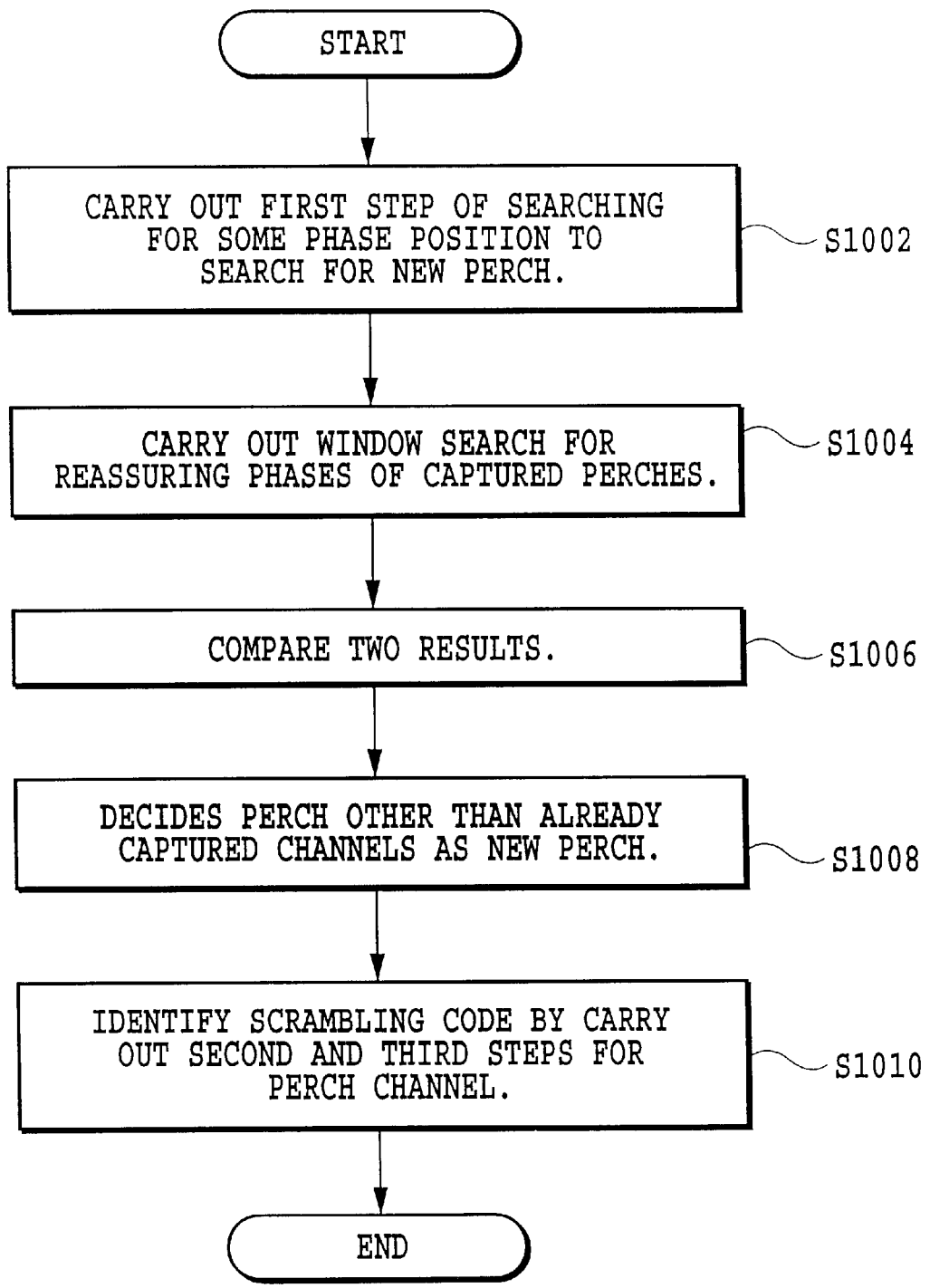
FIG. 11 is a flowchart illustrating an operation of the mobile station in FIG. 8.

FIG. 8 is a schematic diagram illustrating an operation of making a decision of a new perch. The operation of the mobile station of FIG. 8 will be described with reference to a flowchart of FIG. 11.

FIG. 8 illustrates a case which carries out only the first step as the new perch search, and decides a new perch from its result.

To search for the new perch, the mobile station carries out the first step of searching for some phase position (step S1002). Apart from this, it performs a window search for reassuring the phases of the captured perch channels (step S1004). Subsequently, it compares both the results (step S1006); makes a decision that any perch other than the currently captured perches is a new perch channel (step S1008); and identifies the scrambling code by executing the second and third steps for the perch channel (step S1010).

Figure 9:
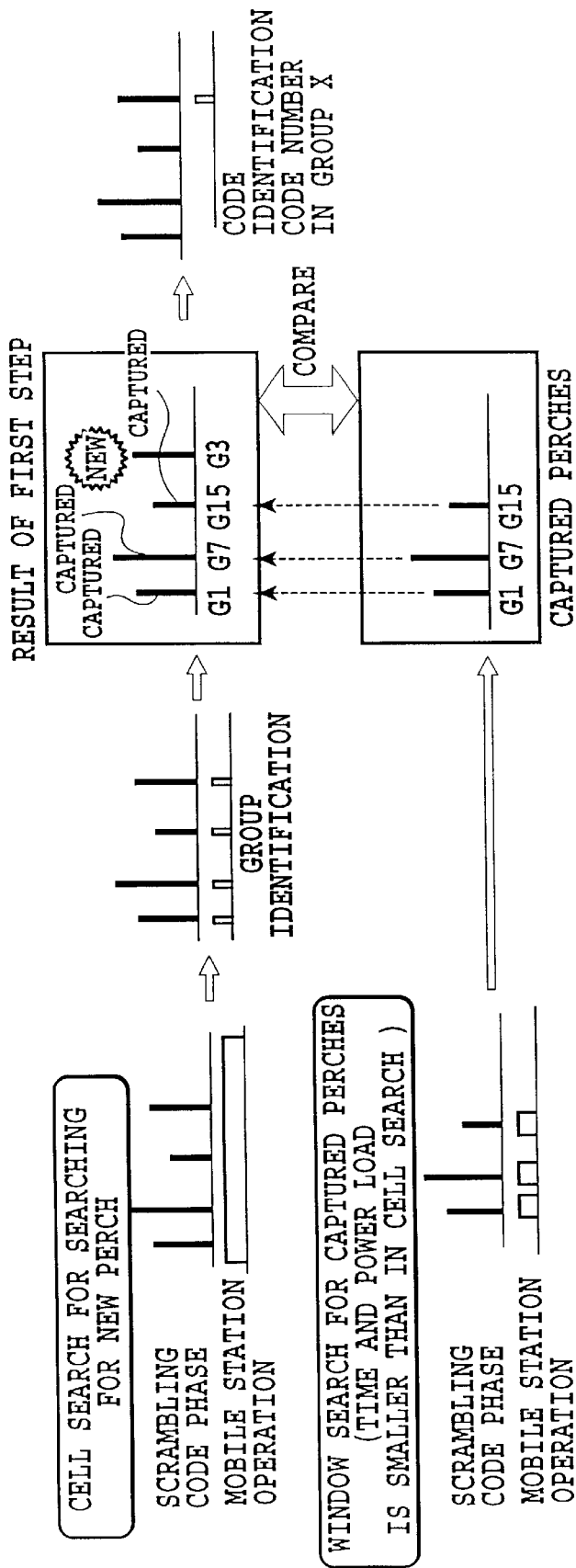
FIG. 9 is a schematic diagram illustrating an operation of deciding a new perch when using the first and second steps to search for the new perch.

FIG. 9 illustrates an example of a decision operation of the new perch using the first and second steps as the new perch search.

It differs from FIG. 8 in that it can make use of the scrambling code group information when deciding as to whether the result of the new perch search is a captured perch or a new perch.

In FIG. 9, G1, G7, G15 and G3 each designate a scrambling code group. More specifically, the G1, G7, G15 and G3 denote that the groups, to which the scrambling codes used for the perches detected at these phases, are the first, seventh, 15th and third group, respectively.

Comparing their phases with those of the scrambling code groups of the captured perches, the mobile station identifies a perch if the phases differ, and then carries out the third step.

In FIG. 9, the perch received at the phase G3 is decided as the new perch because its phase and scrambling code differ from those of the captured perches.

In addition, although not illustrated in the drawings, execution of all the steps from the first to third steps as the new perch search can be implemented in the same manner as illustrated in FIGS. 8 and 9, except that it can use, for deciding the new perch, both the scrambling code and phase as the result of the new perch search.

Although the present embodiment is described for the convenience sake as though the mobile station always carried out the new perch search and captured perch confirmation simultaneously, the embodiments in accordance with the present invention are not limited to this. For example, when carrying out both searches for the new and captured perches regularly, such a configuration can be implemented in which their intervals are set differently so that one of them is carried out at a higher (or lower) frequency than the other. Alternatively, a configuration can be implemented in which they can be controlled adaptively to the conditions as needed. As long as the new perch decision is made by comparing the captured perches with the results of the new perch search, a similar effect can be achieved.

As described above, the present invention can provide the control method of neighboring cell search, and the mobile station, with making use of the advantages of the inter-cell asynchronous system, and with minimizing the power consumption and time required for the cell search by the mobile station without increasing the total cost of the system.

SECOND EMBODIMENT

Next, the second embodiment of the present invention will be described with reference to FIGS. 12–15.

Figure 12:
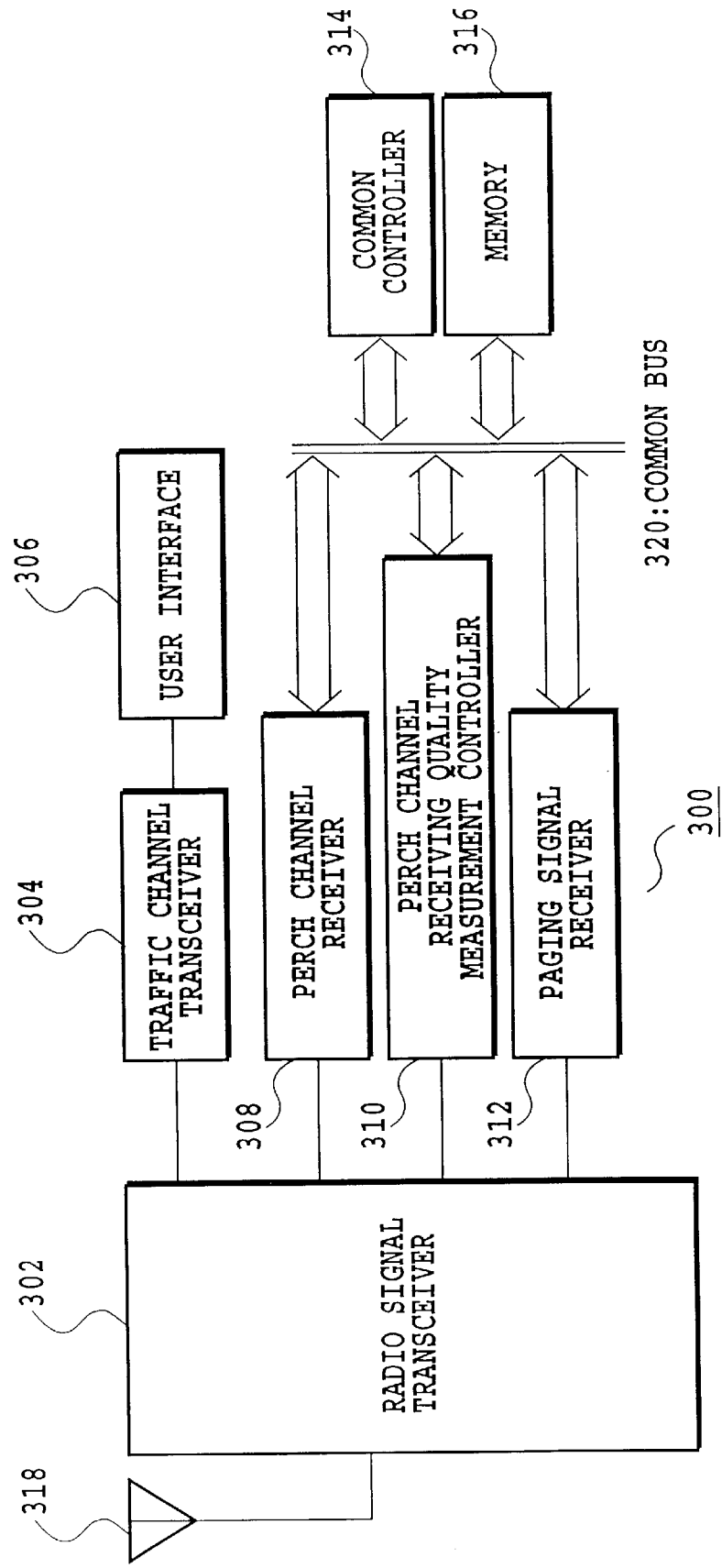
FIG. 12 is a block diagram showing a configuration of a mobile station to which the present invention is applied.

FIG. 12 is a block diagram showing a configuration of a mobile station to which the present invention is applied.

FIG. 12 shows only portions of the mobile station associated with the present invention.

A mobile station 300 comprises a radio signal transceiver 302, a traffic channel transceiver 304, a user interface 306, a perch channel receiver 308, a perch channel receiving quality measurement controller 310, a paging signal receiver 312, a common controller 314, a memory 316, an antenna 318 and a common bus 320.

The radio signal transceiver 302 connected to the antenna 318 is a device for receiving user information and a control signal transmitted from a base station after radio frequency modulation, and for transmitting user information or control information about voices or data to be transmitted from the mobile station to the base station. Although it is integrally illustrated in FIG. 12, the transmitter and receiver can be provided separately. The traffic channel transceiver 304 connected to both the radio signal transceiver 302 and user interface 306 is a device for carrying out codec of the user information such as voice or data. The perch channel receiver 308 measures the receiving quality of the perch channel, and extracts broadcast information from the base station by decoding the perch channel. The perch channel receiving quality measurement controller 310, issuing a command to the perch channel receiver 308, controls the measurement operation of the receiving quality of the perch channel. The paging signal receiver 312 receives and decodes a paging signal sent from the base station. The common controller 314 carries out the overall control of the mobile station, and the memory 316 is used for storing various items of information. The common bus 320 interconnects the perch channel receiver 308, perch channel receiving quality measurement controller 310, paging signal receiver 312, common controller 314 and memory 316.

Next, the operation of the mobile station with such a configuration will be described with reference to FIGS. 13 and 14.

Figure 1:
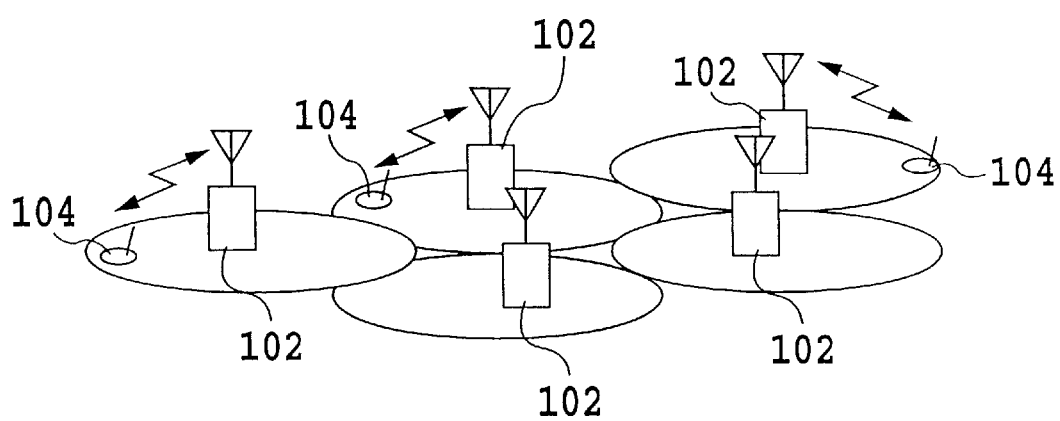
FIG. 1 is a diagram illustrating an example of a mobile communication system.
Figure 2:
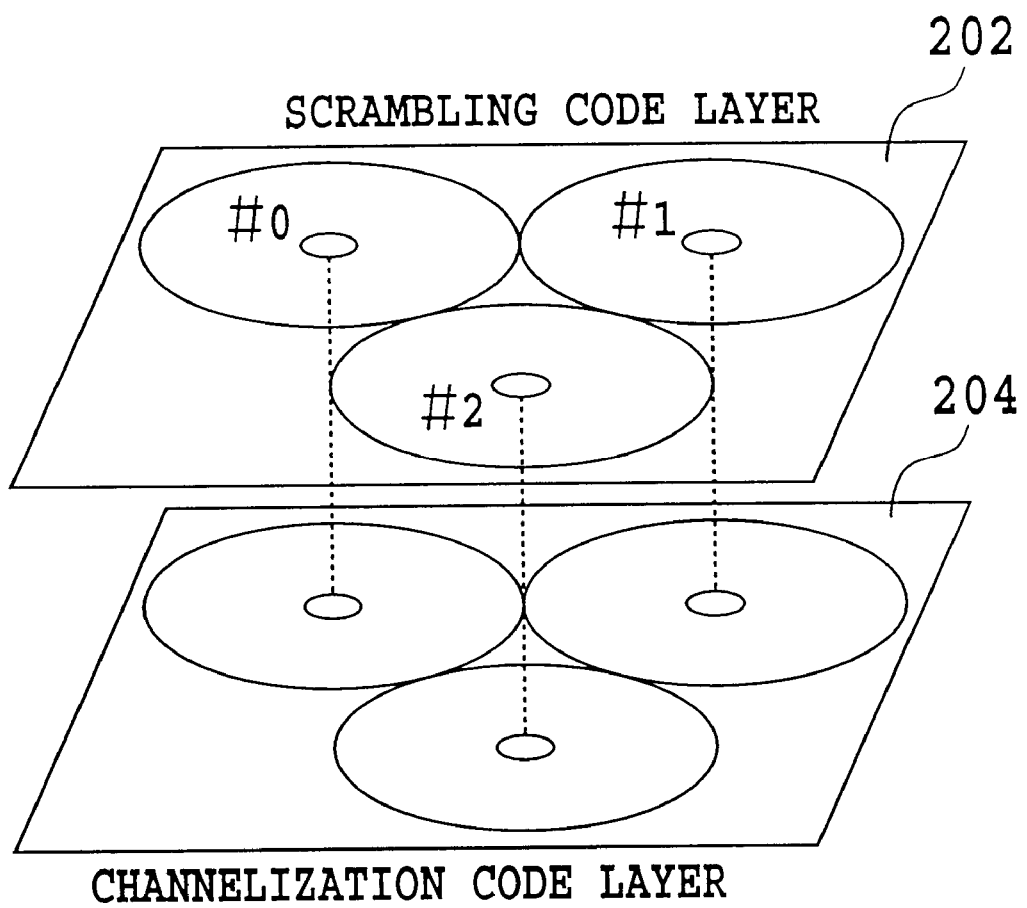
FIG. 2 is a schematic diagram illustrating a method of using spreading codes of the mobile communication system.
Figure 3:
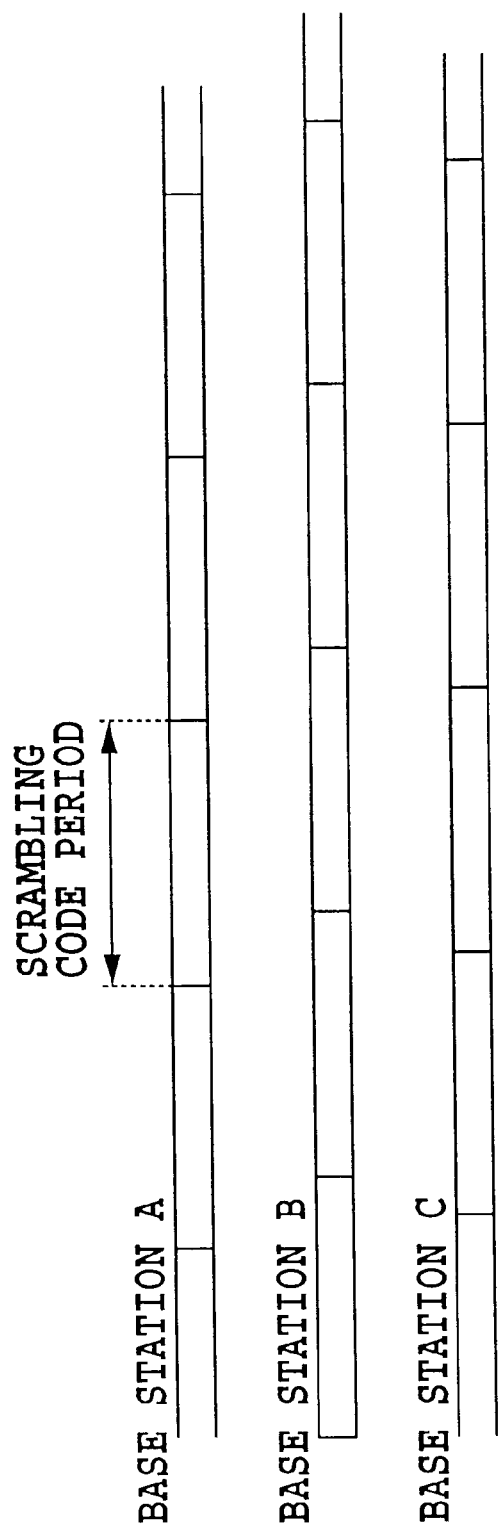
FIG. 3 is a schematic diagram illustrating relationships of the timing between scrambling codes for the signals transmitted from base stations to a mobile station.
Figure 4:
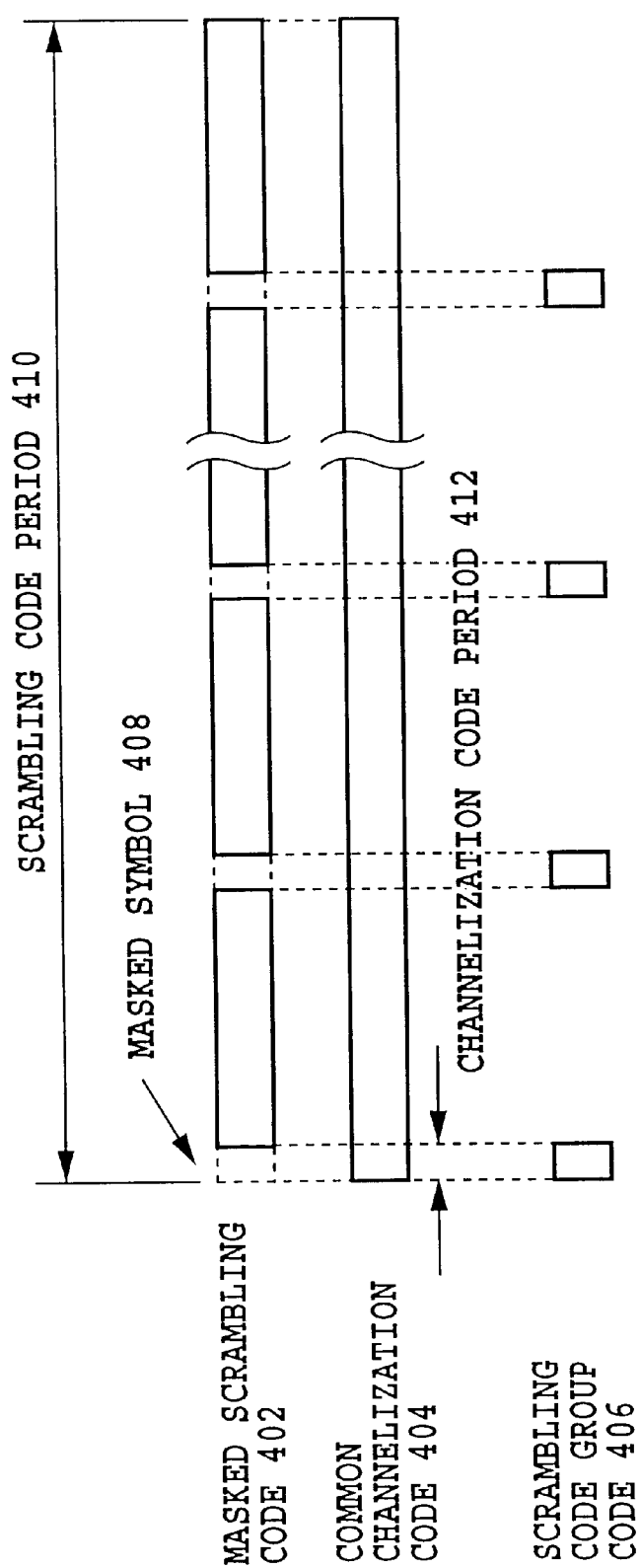
FIG. 4 is a schematic diagram illustrating a structure of a perch channel.
Figure 5:
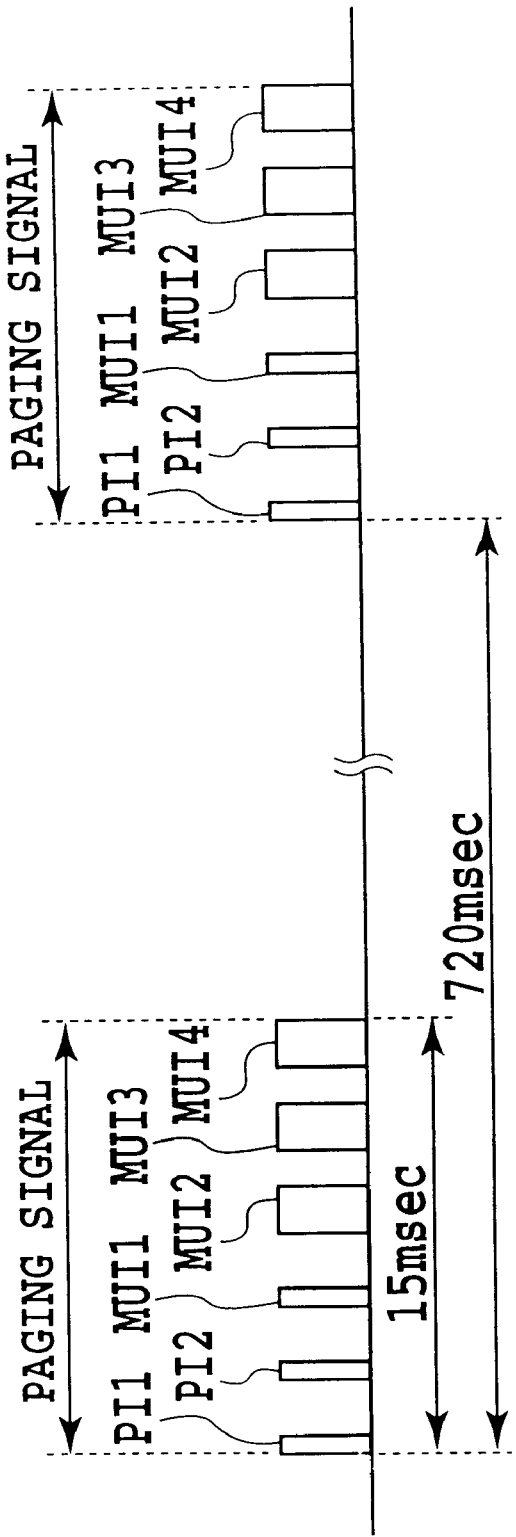
FIG. 5 is a schematic diagram illustrating a structure of a paging channel.

As described above, the intermittent receiving technique is applied to the mobile station. Besides, as disclosed in the foregoing paper "Japan's Revised Proposal for Candidate Radio Transmission Technology on IMT-2000: W-CDMA Revised Proposal Version 1.1", a great number of mobile stations are divided into a plurality of groups, and each paging signal assigned to one of the groups is mapped onto a single physical channel to configure the paging channels. FIG. 5 illustrates a paging signal assigned to one of the groups. In FIG. 5, reference symbols PIs each designate a very short signal informing whether paging is present or not; and MUIs each designate a portion including paging information (ID number of mobile station). The mobile station receives the PI portion, first, and then the MUI portion only when a decision is made that the paging is present from the receiving result of the PI portion.

Figure 13:
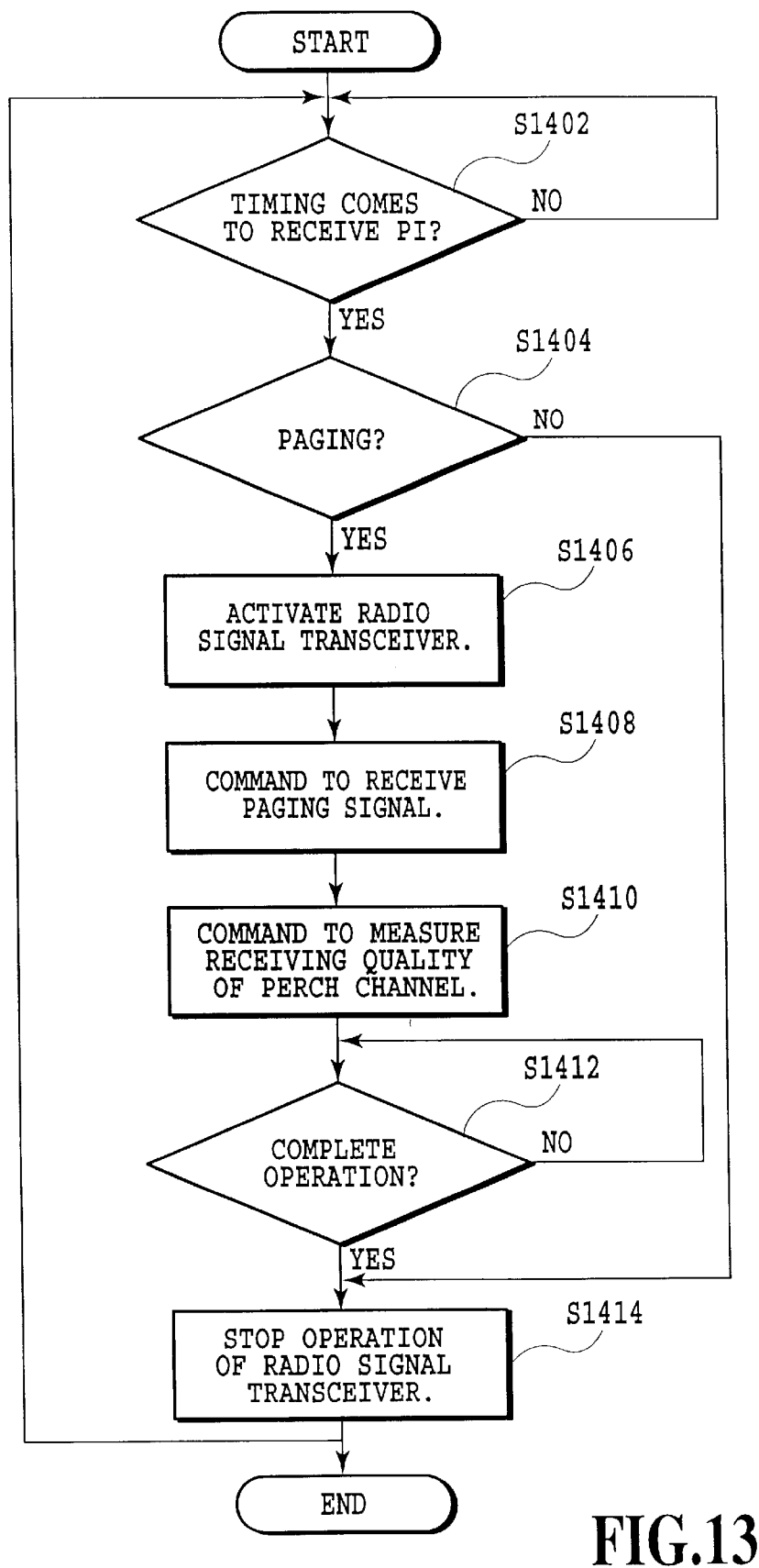
FIG. 13 is a flowchart illustrating an operation of a mobile station in accordance with the present invention.

FIG. 13 is a flowchart illustrating the operation of the mobile station in accordance with the present invention.

The mobile station decides as to whether a timing for receiving the PI comes, first (step S1402), and when the timing comes, it activates the radio signal transceiver 302 to receive the PI portion in the paging signal (step S1404). When it decides that the paging is not present from the receiving result, it stops the operation of the radio signal transceiver 302 (step S1414). In contrast, when it decides that the paging is present, it continues to operate the radio signal transceiver 302 (step S1406). At the same time, it commands the paging signal receiver 312 to receive the paging signal (step S1408), and causes the perch channel receiving quality measurement controller 310 to issue the command to the perch channel receiver 308 to measure the receiving quality of the perch channel (step S1410). Subsequently, it decides whether the individual operations have been completed (step S1412), stops the operation of the radio signal transceiver 302 when completed (step S1414), and waits until the next timing of receiving the PI comes (step S1402).

Figure 14:
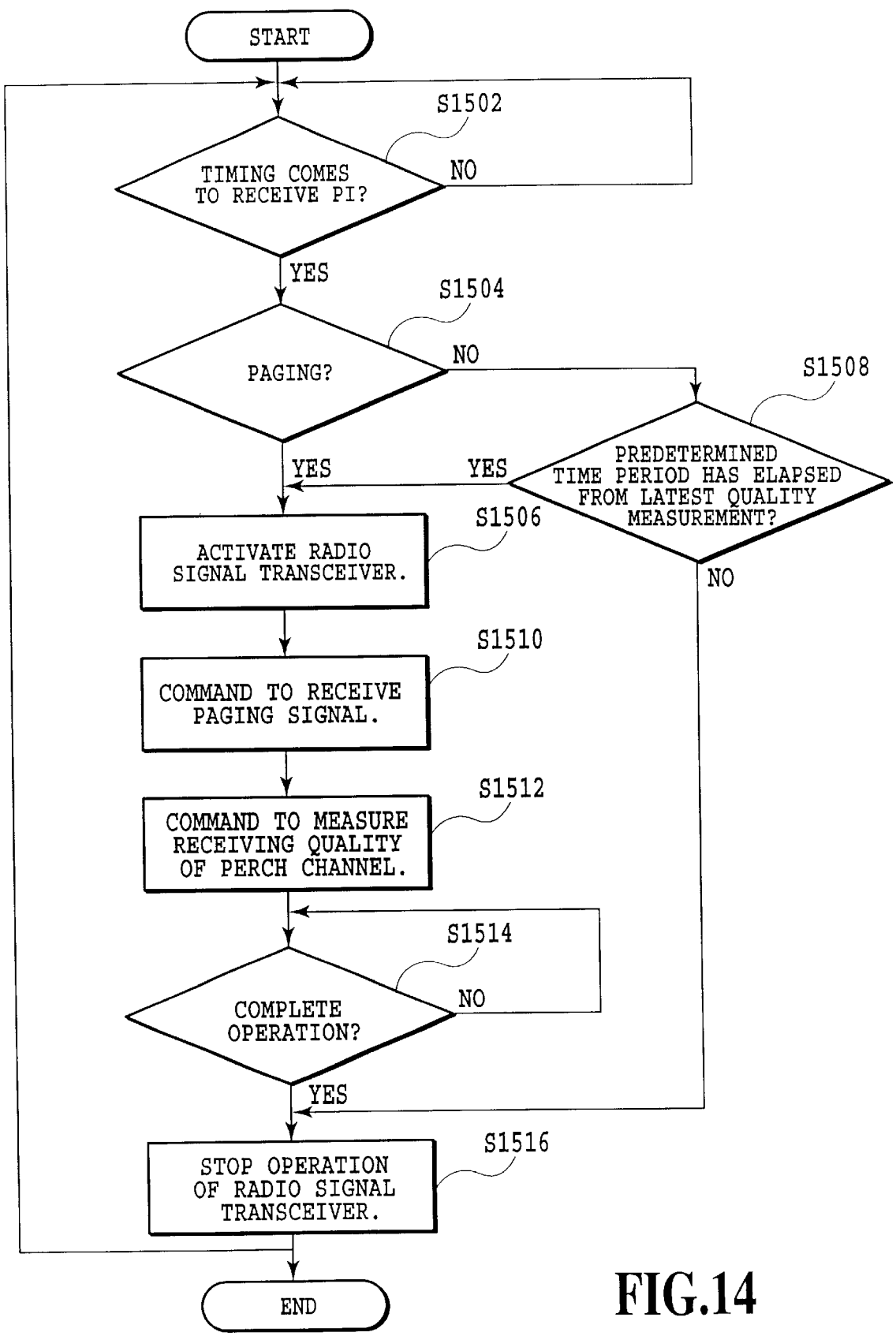
FIG. 14 is a flowchart illustrating an operation of a mobile station in accordance with the present invention.

FIG. 14 is a flowchart illustrating the operation of the mobile station with a configuration of carrying out the next quality measurement at the time when a predetermined time period has elapsed after the previous quality measurement.

The mobile station decides as to whether a timing for receiving the PI comes, first (step S1502), and when the timing comes, it activates the radio signal transceiver 302 to receive the PI portion in the paging signal (step S1504). When it decides that the paging is not present from the receiving result, it proceeds to the decision step of the elapsed time from the latest quality measurement (step S1508). When the elapsed time has exceeded the predetermined value, it carries out the same operation as when the decision is made that the paging is present (step S1506). When the elapsed time is below the predetermined value, it halts the operation of the radio signal transceiver 302 (step S1516), and waits for the next timing (step S1502). In contrast, when it decides that the paging is present at step S1504, it continues to operate the radio signal transceiver 302 (step S1506). At the same time, it commands the paging signal receiver 312 to receive the paging signal (step S1510), and causes the perch channel receiving quality measurement controller 310 to issue the command to the perch channel receiver 308 to measure the receiving quality of the perch channel (step S1512). Subsequently, it decides as to whether the individual operations have been completed (step S1514), stops the operation of the radio signal transceiver 302 when completed (step S1516), and waits until the next timing of receiving the PI comes (step S1502).

Figure 15:
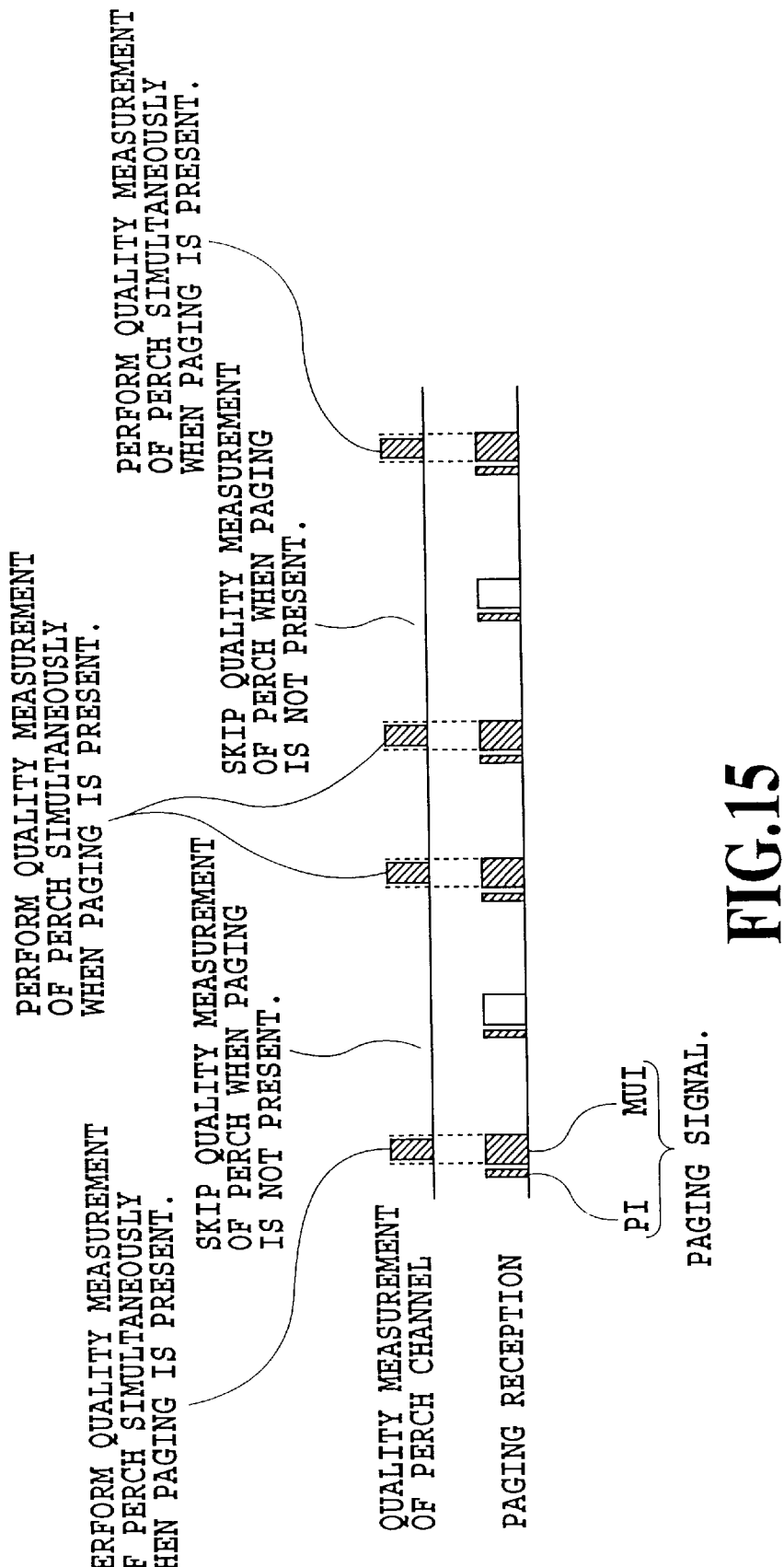
FIG. 15 is a schematic diagram illustrating an operation state observed on a time axis when the cell search control method in accordance with the present invention is operating.

FIG. 15 is a schematic diagram illustrating an operation state observed on a time axis when the cell search control method in accordance with the present invention is operating.

In FIG. 15, the top view illustrates the quality measurement of the perch channel, and the bottom view illustrates the paging reception. Shadowed portions in the top view denote portions of executing the quality measurement of the perch channel. The bottom view illustrates the paging reception taking an example of a paging channel in which a paging signal consists of the PIs (narrow portions) and MUIs (wide portions). When the PIs indicate the presence of the paging information, the corresponding MUIs are denoted as a shadowed portion, whereas when they indicate the absence of the paging information, the MUIs are denoted as a blank. Thus, the mobile station does not receive the blank MUIs because they have no paging information.

As illustrated in FIG. 15, according to the present invention, the receiving quality measurement of the perch channel is controlled in accordance with the presence or absence of the paging information. Specifically, when the paging information is present, the measurement of the perch channel receiving quality is executed at the same time as the paging reception, whereas when the paging information is absent, the measurement of the perch channel receiving quality is skipped.

As described above, the embodiment according to the present invention is configured such that the mobile station controls the timing of measuring the receiving quality of the perch channel in synchronization with the paging signal to the mobile station so that the measurement of the receiving quality of the perch channel is carried out simultaneously with the reception of the paging signal. This makes it possible to save the power consumption with maintaining the high accuracy of selecting the best base station.

Furthermore, the embodiment is configured such that it counts the elapsed time from the measurement of the receiving quality of the perch channel, and when the elapsed time exceeds the predetermined value, it carries out the measurement of the receiving quality of the perch channel. This makes it possible to maintain the accuracy of selecting the best base station at a higher accuracy, making is possible to further reduce the power consumption.

OTHER EMBODIMENTS

As to the standards of the third generation mobile communication system, IMT-2000 (International Mobile Telecommunications-2000), the 3GPP (Third Generation Partnership Project) is making a plan. Details of paging information transmission method is described in the standard "3GTS 25.211 V3.3.0". To increase the versatility of the standard, it is modified slightly from the "Japan's Revised Proposal for Candidate Radio Transmission Technology on IMT-2000: W-CDMA". Specifically, it is configured such that the information about the presence and absence of the paging is transmitted over a PICH (Paging Indicator CHannel), and the paging information itself is transmitted over an SCCPCH (Secondary Common Control Physical CHannel). Although the physical configuration is thus modified, the standard is the same as the present specification in the procedure for the mobile station to receive the PI portion before receiving the paging information, and to receive the paging information itself only when a decision is made that the paging is present as a result of receiving the PI, and in the effect of the intermittent reception obtained from the procedure. Accordingly, it will be obvious for those skilled in the art that the present invention is applicable to the "3GTS 25.211 V3.3.0". In addition, it is obvious for those skilled in the art that the present invention is not limited to the radio schemes described above, but can be implemented in any radio schemes utilizing the present invention.

Moreover, although the foregoing embodiments handle the case in which the embodiments are implemented independently, the present invention is not limited to this. For example, any proper combination of the foregoing embodiments can be implemented, which will be obvious to those skilled in the art.

What is claimed is:

1. A control method of searching for a neighboring cell of a mobile station communicating with base stations in a direct sequence CDMA mobile communication system which transmits information by carrying out double modulation using a first spreading code group and one of second spreading codes, the first spreading code group including spreading codes that have a same repetition period as an information symbol period and are used in common by the base stations, the second spreading codes having a repetition period longer than the information symbol period, and being different for each of the base stations, said control method of searching for a neighboring cell comprising:

a step of storing into a first table the second spreading code and its phase of at least one perch channel, which second spreading code and phase are known;

a step of storing a second spreading code used by a neighboring base station into a second table;

a first search step of searching for a perch channel whose second spreading code and phase are unknown; and a second search step of searching for a perch channel whose second spreading code and phase are known, wherein said control method of searching for a neighboring cell carries out the first search step and the second search step using the first table and the second table.

2. The control method of searching for a neighboring cell as claimed in claim 1, further comprising the step of transferring, when capturing a perch channel in the first search step of searching for a perch channel whose second spreading code and phase are unknown, the second spreading code corresponding to the perch channel from the second table to the first table.

3. The control method of searching for a neighboring cell as claimed in claim 1 or 2, further comprising the steps of:

carrying out the second search step using the first table;
   carrying out the first search step using the second table; and
   detecting a new perch channel by comparing a search result at the second search step with a search result at the first search step.

4. The control method of searching for a neighboring cell as claimed in claim 1, wherein said first search step comprises:

a step of detecting a peak of a received signal at a timing of a masked symbol of the received signal by despreading the received signal using the first spreading code group;

a step of identifying a group to which the second spreading code belongs; and a step of identifying the second spreading code.

5. The control method of searching for a neighboring cell as claimed in claim 4, comprising the steps of:

carrying out the second search step using the first table;
   carrying out a third search step using the second table, the third search step consisting of part of sub-steps constituting the first search step;
   deciding detection of a new perch channel by comparing a search result of the second search step with a search result of the third search step; and
   carrying out a fourth search step in response to a decision result, the fourth search step consisting of sub-steps of the first search step, which are not carried out in the third search step.

6. The control method of searching for a neighboring cell as claimed in claim 1, wherein said direct sequence CDMA mobile communication system spreads information into a signal with a bandwidth broader than a frequency bandwidth of the information using a spreading code sequence with a rate higher than an information transmission rate.

7. A mobile station communicating with base stations in a direct sequence CDMA mobile communication system which transmits information by carrying out double modulation using a first spreading code group and one of second spreading codes, the first spreading code group including spreading codes that have a same repetition period as an information symbol period and are used in common by the base stations, the second spreading codes having a repetition period longer than the information symbol period, and being different for each of the base stations, said mobile station comprising:

a first table for storing the second spreading code and its phase of at least one perch channel, which second spreading code and phase are known;

a second table for storing a second spreading code used by a neighboring base station;

first search means for searching for a perch channel whose second spreading code and phase are unknown; and a second search means for searching for a perch channel whose second spreading code and phase are known, wherein said first search means and said second search means carry out their search using said first table and said second table.

8. The mobile station as claimed in claim 7, further comprising means for transferring, when said first search means captures a perch channel whose second spreading code and phase are unknown as a result of the search, the second spreading code corresponding to the perch channel from the second table to the first table.

9. The mobile station as claimed in claim 7 or 8, wherein said second search means carries out its search using the first table;

said first search means carries out its search using the second table, and wherein said mobile station further comprises: means for making decision of detecting a new perch channel by comparing a search result by said second search means with a search result by said first search means.

10. The mobile station as claimed in claim 7, wherein said first search means comprises:
   means for detecting a peak of a received signal at a timing of a masked symbol of the received signal by despreading the received signal using the first spreading code group;
   means for identifying a group to which the second spreading code belongs; and
   means for identifying the second spreading code.

11. The mobile station as claimed in claim 10, wherein said second search means carries out its search using said first table, and where in said mobile station further comprise:
   third search means for carrying out its search using said second table, said third search means consisting of part of said first search means;
   means for deciding detection of a new perch channel by comparing a search result of said second search means with a search result of said third search means; and
   fourth search means for carrying out its search in response to a decision result, said fourth search means consisting of a remaining part of said first search means.

12. The mobile station as claimed in claim 7, wherein said direct sequence CDMA mobile communication system spreads information into a signal with a bandwidth broader than a frequency bandwidth of the information using a spreading code sequence with a rate higher than an information transmission rate.

13. A direct sequence CDMA mobile communication system comprising the mobile station as claimed in claim 7.

* * * * *

UNITED STATES PATENT AND TRADEMARK OFFICE
CERTIFICATE OF CORRECTION

PATENT NO. : 6,697,622 B1
DATED : February 24, 2004
INVENTOR(S) : Yoshihiro Ishikawa et al.

It is certified that error appears in the above-identified patent and that said Letters Patent is hereby corrected as shown below:

Column 1,
Line 5, before "Japanese" change "is based on" to -- claims priority under 35 U.S.C. 119 to --
Line 25, after "channels" start a new paragraph.

Column 2,
Line 33, before ", but varies" change "distant" to -- distance --
Line 51, after "Sawahashi" remove "go"

Column 3
Line 45, before ", but varies" change "distant" to -- distance --
Line 48, after "with the" change "move" to -- movement --
Line 54, before "uncaptured" insert -- an --

Column 4,
Line 51, after "will" change "results" to -- result --

Column 10,
Line 19, after "illustrating an" change "operational" to -- operation --

Column 14,
Line 58, before "possible" change "is" to -- it --

Signed and Sealed this

Sixteenth Day of November, 2004

JON W. DUDAS
*Director of the United States Patent and Trademark Office*